United States Patent [19]
Yoshida

[11] Patent Number: 5,622,640
[45] Date of Patent: Apr. 22, 1997

[54] CONTROL OF WARMING TIME AND/OR POWER SUPPLIED TO A HEATER IN A BREAD WARMING SYSTEM BASED ON RATE OF TEMPERATURE CHANGE DURING PREVIOUS BAKING OPERATION

[75] Inventor: Shinji Yoshida, Daito, Japan

[73] Assignee: Funai Electric Co., Ltd., Osaka, Japan

[21] Appl. No.: 547,310

[22] Filed: Oct. 24, 1995

[30] Foreign Application Priority Data

Oct. 26, 1994 [JP] Japan ................................. 6-262184

[51] Int. Cl.⁶ ................................................. H05B 1/02
[52] U.S. Cl. ............................ 219/497; 219/492; 219/501; 99/327; 99/348
[58] Field of Search ................................. 219/497, 499, 219/501, 492, 491, 505, 508; 99/325, 348, 329 R, 330, 331

[56] References Cited

U.S. PATENT DOCUMENTS 4,476,373  10/1984  D'Antonio ............................ 219/121 P
4,585,925  4/1986  Andre ........................................ 219/497
4,948,950  8/1990  Rae ............................................ 219/497

FOREIGN PATENT DOCUMENTS 5-60363  2/1993  Japan .

*Primary Examiner*—Mark H. Paschall
*Attorney, Agent, or Firm*—Bacon & Thomas

[57] ABSTRACT

A warming method in a bread maker characterized as detecting an increasing rate of the baking chamber temperature at the start of the baking operation or a decreasing rate of the baking chamber temperature after the baking operation has ended using a temperature detecting section and a rate detecting section based on an output of an oven sensor, and as causing a heater control section to change either a warming time, which is a time of the warming operation, or warming power to be supplied to a heater during the warming operation, or both the warming time and the warming power based on the detected rate. As a result, the impairment of the flavor of bread can be prevented without being affected by the type of bread to be baked or by the outside temperature.

8 Claims, 4 Drawing Sheets

FIG. 3

| INCREASING TIME | WARMING TIME |
|---|---|
| 15 MINUTES OR LESS | b1 |
| 15 - 20 MINUTES | b2 |
| 20 MINUTES OR MORE | b3 |

FIG. 4

| INCREASING TIME | WARMING TIME |
|---|---|
| 5 MINUTES OR LESS | b4 |
| 5 - 6 MINUTES | b5 |
| 6 MINUTES OR MORE | b6 |

| DECREASING TIME | WARMING TIME |
|---|---|
| 2 MINUTES OR LESS | a1 |
| 2 - 3 MINUTES | a2 |
| 3 MINUTES OR MORE | a3 |

CONTROL OF WARMING TIME AND/OR POWER SUPPLIED TO A HEATER IN A BREAD WARMING SYSTEM BASED ON RATE OF TEMPERATURE CHANGE DURING PREVIOUS BAKING OPERATION

BACKGROUND OF THE INVENTION

The invention relates to a bread maker that keeps a baking chamber thereof warm after the baking operation has ended and, in particular, to a warming method in a bread maker in which the operation of keeping the baking chamber warm is controlled based on either a rate of temperature increasing of the baking chamber at the start of the baking operation or a rate of temperature decreasing of the baking chamber after the end of the baking operation.

Since fresh-baked bread is giving off steam, a drastic drop in the temperature of the chamber wall of the baking chamber leaves dew condensation on the chamber wall. The moisture in the dew condensation is then absorbed by the bread, which in turn impairs the flavor of the bread. To avoid such circumstances, Japanese Patent Examined Publication No. Hei. 5-60363 proposes a conventional technique.

This conventional technique is characterized as effecting primary warming for a predetermined time, the primary warming being designed to supply the heater with power that is about 20% of the power supplied for baking. Therefore, the chamber wall temperature does not exhibit a drastic drop, but the chamber wall temperature decreases at a rate analogous to the decreasing rate of the baking chamber temperature. As a result, bedewing on the chamber wall can be prevented, in turn preventing the flavor of the bread from being impaired as well.

However, the decreasing rate of the baking chamber temperature after the baking operation has ended is changed by the type and quantity of bread to be baked as well as by outside temperature. On the other hand, since primary warming is carried out only for a predetermined time by supplying the heater with predetermined power, there still may be the possibility that the chamber wall temperature will be decreased by the type and quantity of bread to be baked and the outside temperature upon end of the primary warming. It is for this reason that the bread case has often bedewed. If a longer primary warming time is selected to overcome this problem, the bread surface becomes so dry that the good flavor of the bread is lost.

SUMMARY OF THE INVENTION

The invention has been made to overcome the aforementioned problems. The object of the invention is, therefore, to provide a warming method in a bread maker that can prevent the impairment of the flavor of bread without being affected by the type and quantity of bread to be baked or by outside temperature.

To achieve the above object, the invention provides a warming method in a bread maker having a heater for heating a baking chamber and performing an operation of keeping the baking chamber warm by supplying the heaters with a power after a baking operation has ended, the power being smaller than that to be supplied during the baking operation, the method including the steps of: detecting a rate of temperature increasing of the baking chamber at the start of the baking operation; and changing at least one of a warming time which is a time of the operation of keeping the baking chamber warm, and a warming power to be supplied to the heater during the keeping operation, so as to correspond to the detected rate.

Further, the invention provides a warming method in a bread maker having a heater for heating a baking chamber and performing an operation of keeping the baking chamber warm by supplying the heater with a power after a baking operation has ended, the power being smaller than that to be supplied during the baking operation, the method including the steps of: detecting a rate of temperature decreasing of the baking chamber after the baking operation has ended; and changing at least one of a warming time which is a time of the operation of keeping the baking chamber warm, and a warming power to be supplied to the heater during the keeping operation, so as to correspond to the detected rate.

BRIEF DESCRIPTION OF THE DRAWINGS

FIG. 3 is a diagram showing a data table relating a time required for the baking chamber temperature to increase at the start of the baking operation to a primary warming time in the case of baking bread;

FIG. 4 is a diagram showing a data table relating a time required for the baking chamber temperature to increase at the start of the baking operation to a primary warming time in the case of baking cakes;

DETAILED DESCRIPTION OF THE PREFERRED EMBODIMENTS

An embodiment of the invention will now be described with reference to the drawings.

Figure 2:
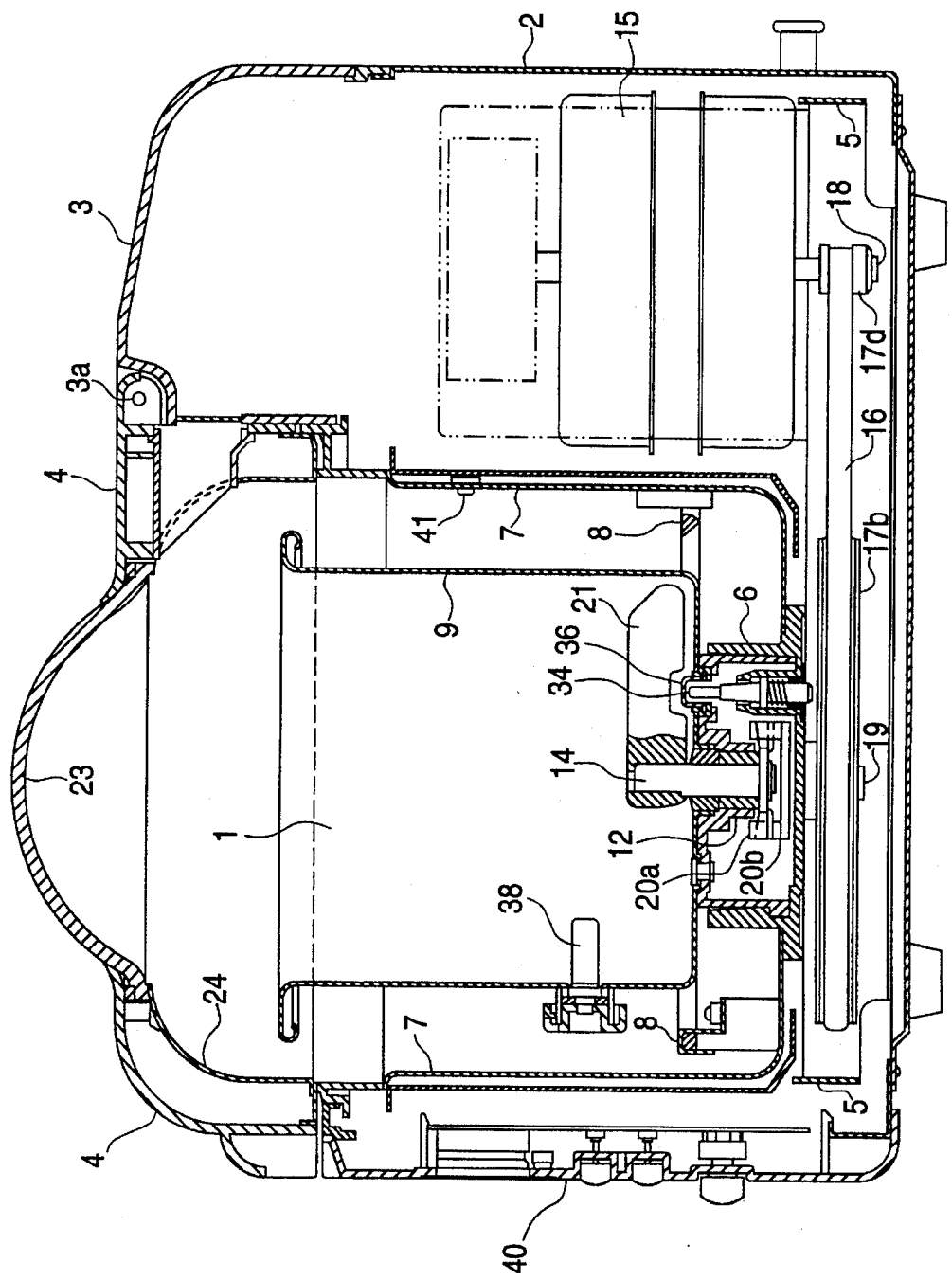
FIG. 2 is a sectional view showing the bread maker.

FIG. 2 is a sectional view showing a bread maker to which the embodiment of the invention is applied.

In FIG. 2, an upper case 3 mounted on the top of a main body case 2 by fitting has a cover 4 that can be opened and closed through a pivot 3a. Fixed onto the bottom of the main body case 2 is a base frame 5. The base frame 5 has an inner case 7 through a bearing plate 6. A ringlike hot-wire heater 8 is mounted on the lower side of the inner case 7. A baking case 9 that is designed to knead, ferment, bake, etc., the bread baking ingredients such as flour and yeast is mounted inside the inner case 7 so as to be removable through the bearing plate 6.

A bearing section 12 is formed at the bottom center of the baking case 9. An upper rotating shaft 14 is rotatably supported by the bearing section 12. A stirring motor 15 is mounted on one side of the base frame 5. The rotation of the stirring motor 15 is transmitted to a lower rotating shaft 19 via an output shaft 18, a pulley 17d, a belt 16, and a pulley 17b. The upper rotating shaft 14 and the lower rotating shaft 19 are coupled to each other so as to be rotatable together through a pair of clutches 20a and 20b that can be separated from each other. A stirring blade 21 is mounted on the top of the upper rotating shaft 14.

In the middle of the cover 4 is an upwardly projecting spherically curved glass window 23, which has a heat reflecting film formed over the inner surface thereof. In the portions other than the glass window 23 in the lower part of the cover 4 is a heat reflecting plate 24 that is designed to prevent heat from the baking case 9 from being reflected outside. On the bottom of the baking case 9 is an upwardly projecting detecting window 36 that is arranged at an eccentric position. Under the detecting window 36 is a dough sensor 34 that is pressed upward. At a slightly lower position on a lateral surface of the baking case 9 is a projecting body 38 that is designed to prevent the dough from rotating at the time of kneading.

At a position close to the top of one lateral surface of the inner case 7 is an oven sensor 41 that is designed to indirectly detect the temperature of a baking chamber 1 that is an inner space of the backing case 9. On one lateral surface of the main body case 2 is an operation section 40 having switches and the like for selecting various operations, such as a switch for selecting the type of bread to be baked and a reservation switch for setting the baking time.

Figure 1:
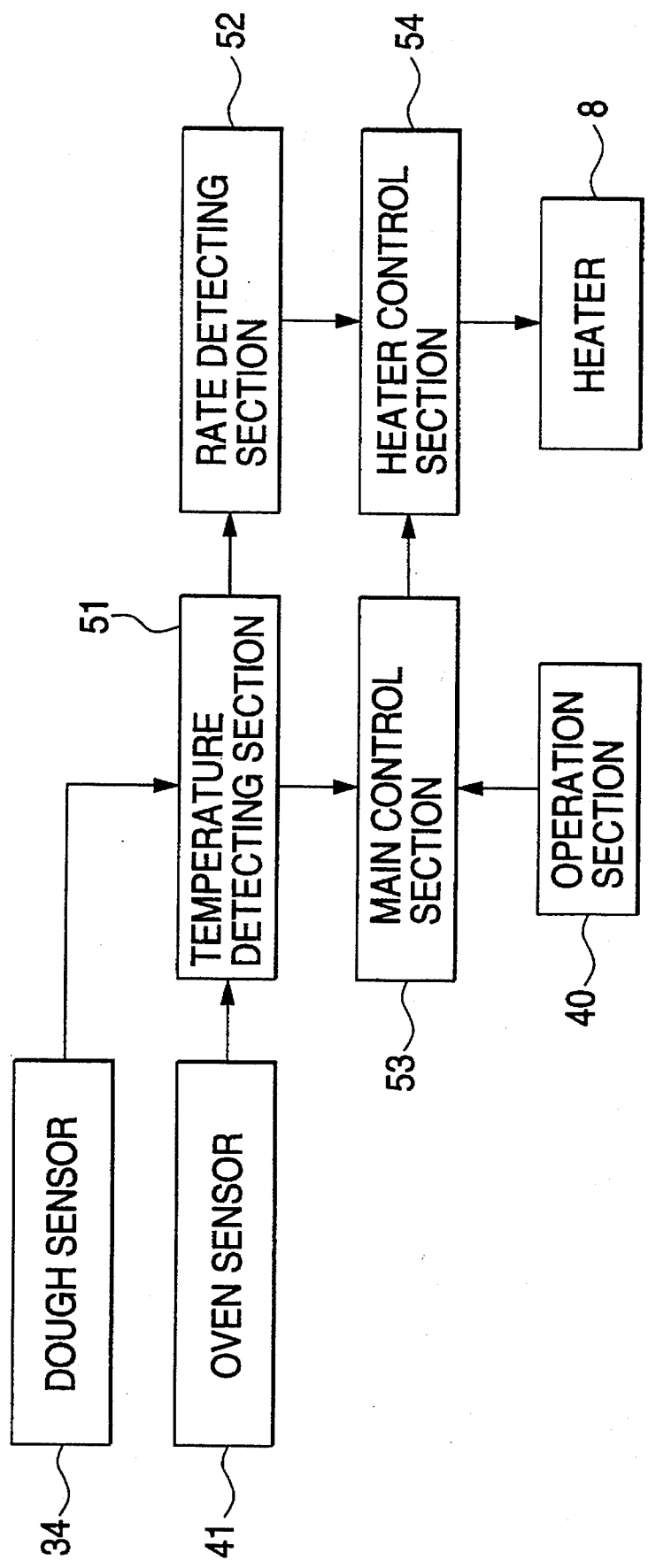
FIG. 1 is a block diagram showing the configuration of an electric part of a bread maker to which an embodiment of a warming method of the invention is applied.

FIG. 1 is a block diagram showing the configuration of an electric part of the bread maker shown in FIG. 2.

A temperature detecting section 51 into which an output of the dough sensor 34 and an output of the oven sensor 41 are introduced forms a block that judges whether or not the temperature detected by the dough sensor 34 or the temperature detected by the oven sensor 41 has reached a set temperature. That is, once the type of sensor to be selected for the temperature detection and the temperature to be detected have been instructed from a main control section 53, and when the output of the sensor instructed for the temperature detection (34 or 41) indicates the set temperature value, the temperature detecting section 51 informs the main control section 53 or a rate detecting section 52 of that fact as necessary.

The rate detecting section 52 forms a block for detecting the increasing rate of the temperature of the baking chamber 1 based on the output of the temperature detecting section 51. That is, when the output of the temperature detecting section 51 gives an indication that the output of the oven sensor 41 has reached a preset first temperature, 50° C., the rate detecting section 52 starts time measurement. Further, when the output of the temperature detecting section 51 gives an indication that the output of the oven sensor 41 has reached a present second temperature, 140° C. or 160° C., the rate detecting section 52 stops the time measurement. Then, the rate detecting section 52 sends to a heater control section 54 a time interval between the timing at which the time measurement has been started and the timing at which the time measurement has been stopped as a value indicating the increasing rate of the temperature of the baking chamber 1.

The heater control section 54 forms a block for controlling electric conduction to the heater 8, and stores two types of data tables, a data table shown in FIG. 3 and a data table shown in FIG. 4, in advance. The heater control section 54 energizes the heater 8 in accordance with an instruction from the main control section 53 during the process from the fermentation to the baking of the dough. Further, at the time of warming operation, the heater control section 54 refers to one of the two types of data tables so that primary warming control is effected only for a time interval determined so as to correspond to the time interval detected by the rate detecting section 52. Upon completion of the primary warming, the heater control section 54 implements second warming control for a predetermined time interval.

The main control section 53 forms a block for implementing main control for the bread making operation. The main control section 53 gives instructions to the respective sections 51, 52 or 54 as necessary to bake bread and cakes in accordance with instructions inputted from the operation section 40.

It may be noted that the data table shown in FIG. 3 is to be used to bake bread. The increasing time indicates a time interval from the timing at which the output of the oven sensor 41 indicates 50° C., which is the first temperature, to the timing at which the output of the oven sensor 41 indicates 160° C., which is the second temperature. Further, the warming time indicates a predetermined time for the primary warming. Since power is supplied to the heater 8 at a duty of about 40% during the primary warming, a value b1 is set to an optimal value within a range from about 5 to 20 minutes in accordance with the actual shape of the bread maker. Values b1 to b3 are related by an inequality b1<b2<b3. Each of the difference between the values b1 and b2 and the difference between the values b2 and b3 is set to a value within a range from one to several minutes which is optimal for the bread maker actually used.

It may also be noted that the data table shown in FIG. 4 is to be used to bake cakes such as muffins. The increasing time indicates a time interval from the timing at which the output of the oven sensor 41 indicates 50° C., which is the first temperature, to the timing at which the output of the oven sensor 41 indicates 140° C., which is the second temperature. Further, the warming time indicates a predetermined time for the primary warming. Since power is supplied to the heater 8 at a duty of about 20% during the primary warming, a value b4 is set to an optimal value within a range from about 5 to 20 minutes in accordance with the actual shape of the bread maker. Values b4 to b6 are related by an inequality b4<b5<b6. Each of the difference between the values b4 and b5 and the difference between the values b5 and b6 is set to a value within a range from one to several minutes which is optimal for the bread maker actually used.

While it is desirable to set the first temperature to a low value, the embodiment selects 50° C. as the first temperature. The reason therefor is to make the time measurement start timing less affected by outside temperature fluctuation even in the case where the outside temperature fluctuates from one season to another.

Figures 5, 6:
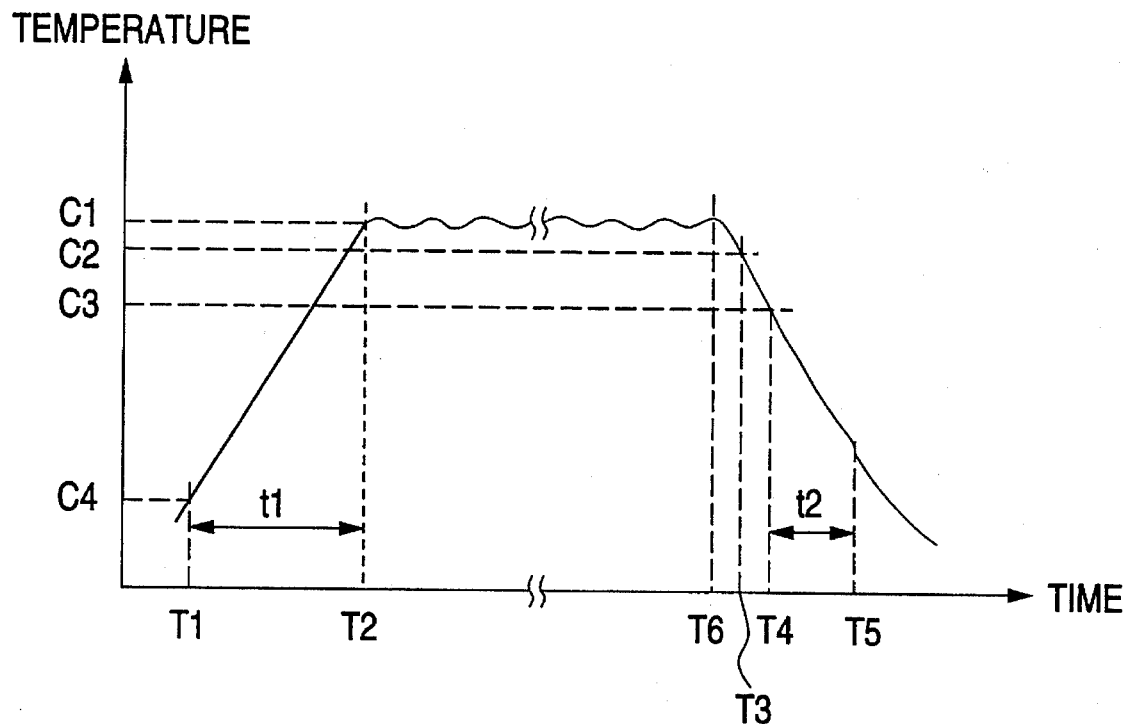
FIG. 5 is a diagram showing a data table relating a time required for the baking chamber temperature to decrease at the end of the baking operation to a primary warming time.
FIG. 6 is a diagram illustrative of a temperature change detected by an oven sensor.

FIG. 6 is a diagram illustrative of a change in the temperature detected by the oven sensor 41. By referring to FIG. 6, the embodiment of the invention to be implemented in the thus constructed bread maker will be described below.

When flour, yeast, and the like are poured into the baking case 9 to bake bread, the operations of stirring, fermenting, etc. are performed. These operations are performed similarly to those in the conventional example. That is, the main control section 53 controls the operation of the stirring motor 15 and the heating operation by the heater 8 in accordance with the output of the temperature detecting section 51 that detects the dough sensor 34 and the oven sensor 41 outputting the predetermined temperatures.

At the start of the baking operation, the main control section 53 instructs the heater control section 54 to heat at a duty of 100%. Further, the main control section 53 also instructs the temperature detecting section 51 to detect the first temperature, 50° C. As a result of these instructions, the heater 8 starts heating, so that the temperature inside the inner case 7 increases. The temperature inside the baking case 9 also increases. When the temperature detected by the oven sensor 41 is 50° C. (indicated by C4) (timing T1), the temperature detecting section 51 instructs the rate detecting section 52 to start measurement. The main control section 53 also instructs the temperature detecting section 51 to detect the second temperature, 160° C.

When the temperature detected by the oven sensor 41 is 160° C. (indicated by C1) (timing T2), the temperature detecting section 51 instructs the rate detecting section 52 to stop the measurement. As a result of these instructions, the rate detecting section 52 measures a time interval t1 between the timing T1 and the timing T2. The measured time interval is sent to the heater control section 54. Further, after the timing T2 onward, the main control section 53 controls the operation so that the temperature inside the inner case 7 remains close to 160° C. When the temperature indicated by the dough sensor 34 becomes a predetermined temperature or when a predetermined time interval has elapsed from the timing T2 (timing T6), heating is stopped.

As a result, the temperature inside the inner case 7 starts decreasing, and so does the temperature inside the baking case 9. When the temperature detecting section 51 gives an indication that the output of the oven sensor 41 is 100° C. (timing T4), the main control section 53 sends a primary warming start instruction to the heater control section 54. In response thereto, the heater control section 54 supplies the heater 8 with power at a duty of 40% to start primary warming. At timing T5, the heater control section 54 drops the duty of the power supplied to the heater 8 to 10% to start secondary warming. The secondary warming time is fixed, or more specifically, to approximately 1 hour. Upon end of the secondary warming, a series of operations are completed.

In the aforementioned operations, if the time interval t1 is 15 minutes or less, then it is judged that the heat capacity of the baking chamber 1 is small and that the temperature inside the baking chamber 1 is decreased fast. Thus, the time interval t2 for primary warming is set to the smallest value b1. If the time interval t1 ranges from 15 to 20 minutes, then it is judged that the heat capacity of the baking chamber 1 is intermediate, and the value b2 is selected. If, further, the time interval t1 is 20 minutes or more, then it is judged that the heat capacity of the baking chamber 1 is large, and the value b3 is selected.

On the other hand, if muffins are to be baked, the data table shown in FIG. 4 is selected to define the time interval for primary warming. In addition, the temperature C1 shown in FIG. 6 is altered to 140° C.

The foregoing describes the embodiment in which the primary warming operation is controlled based on the increasing rate of the temperature of the baking chamber 1. Now, another embodiment in which the primary warming operation is controlled based on the decreasing rate of the temperature of the baking chamber 1 will be described below.

In this embodiment, the heater control section 54 stores the data table shown in FIG. 5 in advance. Values a1 to a3 in this data table are related by an inequality a1>a2>a3. Each of the difference between the values a1 and a2 and the difference between the values a2 and a3 is set to a value within a range from one to several minutes, which is deemed experimentally optimal in accordance with the shape and the like of the bread maker used. The value a1 is set to an optimal value within a range from 10 to 20 minutes.

To bake bread, the temperature detecting section 51 sends a measurement start instruction to the rate detecting section 52 when the output of the oven sensor 41 indicates the first temperature, 140° C. (indicated by C2) (timing T3) after the baking operation has ended. Further, the temperature detecting section 51 sends a measurement stop instruction to the rate detecting section 52 when the output of the oven sensor 41 indicates the second temperature, 100° C. (indicated by C3) (timing T4). In response thereto, the rate detecting section 52 detects a time interval between the timing T3 and the timing T4. Further, the heater control section 54 selects the value a1 as the primary warming time t2 when the time interval detected by the rate detecting section 52 is 2 minutes or less. Furthermore, when the time interval detected by the rate detecting section 52 is between 2 and 3 minutes, the value a2 is selected, and when the detected time interval is 3 minutes or more, the value a3 is selected. Upon completion of the primary warming operation, the secondary warming operation is performed for a fixed period of time.

The reason why the first temperature is set to 140° C. (C2) is that since the baking temperature is set to a value fluctuating in the vicinity of 160° C., it is necessary to eliminate the effects of such fluctuation exerted on the detection of the timing T3.

It may be noted that the invention is not limited to the aforementioned embodiments. While the case in which the warming time is changed has been described with respect to the primary warming control, acceptable are an example in which the duty of the power to be supplied to the heater 8 during primary warming may be changed with the primary warming time constant, and an example in which both the primary warming time and the duty of the power to be supplied to the heater 8 during primary warming may be changed.

The warming method in a bread maker according to the invention is characterized as being applied to a bread maker that has a heater for heating the baking chamber and performs the operation of keeping the baking chamber warm by supplying the heater with power after the end of the baking operation, the power being smaller than that supplied during the baking operation. The method is further characterized as detecting the increasing rate of the baking chamber temperature at the start of the baking operation or the decreasing rate of the baking chamber temperature after the baking operation has ended so that either the warming time, which is the time of the warming operation, or the warming power to be supplied to the heater during the warming operation, or both the warming time and the warming power are changed so as to correspond to the increasing rate or the decreasing rate. Therefore, the difference between the baking chamber temperature and the chamber wall temperature after the baking operation is maintained within such a range as not to bedew without spending too much time for warming. Hence, the impairment of the flavor of the bread can be prevented without being affected by the type and quantity of bread to be baked or by the outside temperature.

What is claimed is:

1. A warming method in a bread maker having a heater for heating a baking chamber and performing an operation of keeping the baking chamber warm by supplying the heater with power after a baking operation has ended, the power being smaller than that to be supplied during the baking operation, said method comprising the steps of:

detecting a rate of temperature increasing of the baking chamber at the start of the baking operation; and changing at least one of a warming time which is a time of the operation of keeping the baking chamber warm, and a warming power to be supplied to the heater during the keeping operation, to the detected rate.

2. The method according to claim 1, wherein the rate is detected based on a time interval required for the temperature of the baking chamber to increase from a preset first temperature to a preset second temperature.

3. The method according to claim 1, wherein the warming time is changed to the detected rate.

4. The method according to claim 1, wherein a duty cycle of the warming power to be supplied to the heater is changed.

5. A warming method in a bread maker having a heater for heating a baking chamber and performing an operation of keeping the baking chamber warm by supplying the heater with power after a baking operation has ended, the power being smaller than that to be supplied during the baking operation, said method comprising the steps of:

detecting a rate of temperature decreasing of the baking chamber after the baking operation has ended; and changing at least one of a warming time which is a time of the operation of keeping the baking chamber warm, and a warming power to be supplied to the heater during the keeping operation, in response to the detected rate.

6. The method according to claim 5, wherein the rate is detected based on a time interval required for the temperature of the baking chamber to decrease from a preset first temperature to a preset second temperature.

7. The method according to claim 5, wherein the warming time is changed in response to the detected rate.

8. The method according to claim 5, wherein a duty cycle of the warming power to be supplied to the heater is changed.

* * * * *